UNITED STATES PATENT OFFICE.

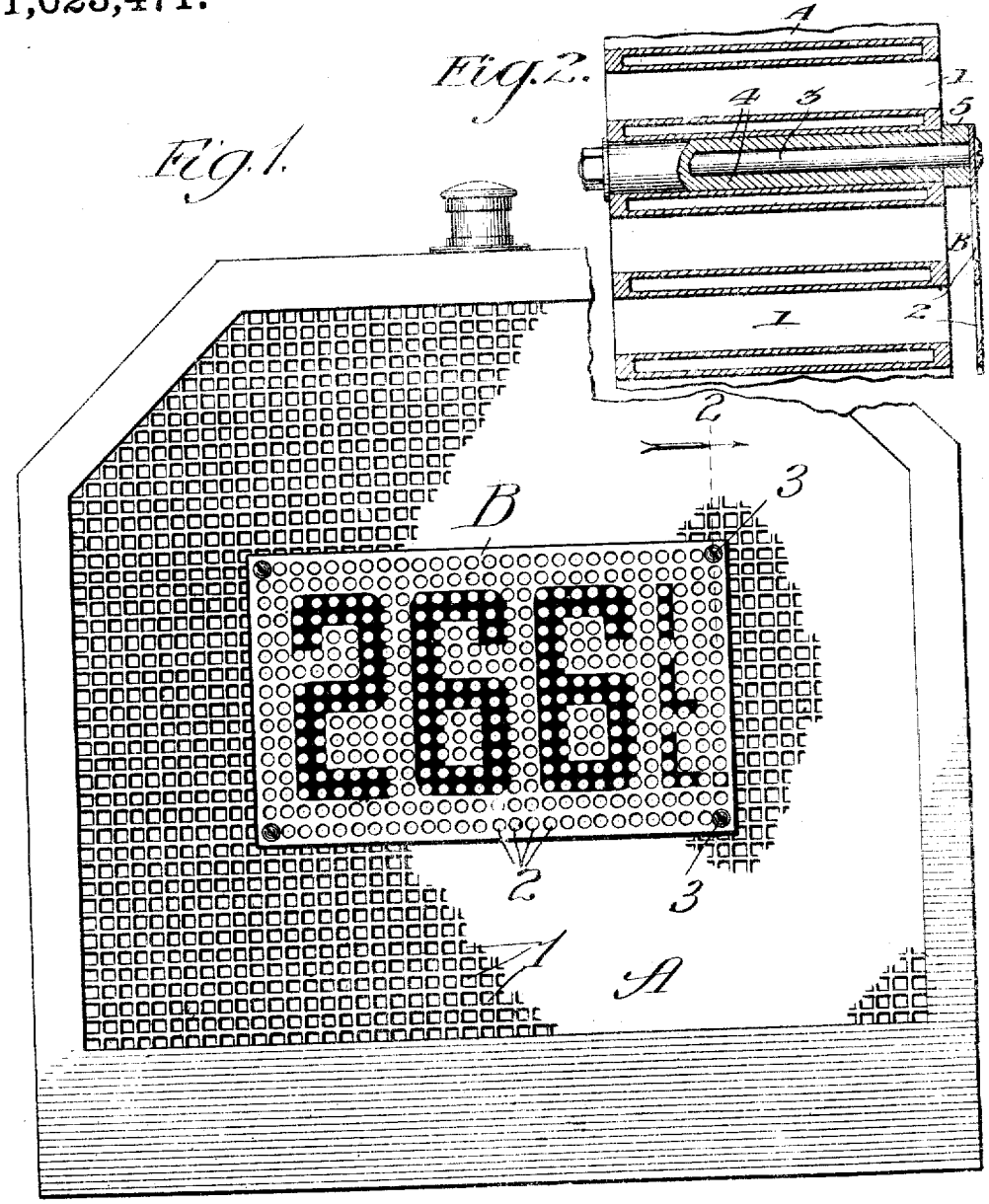

PETER M. HOFFMAN, OF CHICAGO, ILLINOIS.

AUTOMOBILE NUMBER-PLATE.

1,023,471.

Specification of Letters Patent.

Patented Apr. 16, 1912.

Application filed July 24, 1911. Serial No. 640,143.

*To all whom it may concern:*

Be it known that I, PETER M. HOFFMAN, a citizen of the United States, residing at Chicago, in the county of Cook and State of Illinois, have invented a new and useful Improvement in Automobile Number-Plates, of which the following is a specification.

My invention relates particularly to a number plate adapted for use on the front of an automobile.

It is common practice, in automobile construction, to locate the radiator in front of the engine, where it forms virtually the front of the hood housing the engine. Such radiators are of calculated capacity corresponding with the size of the engine; hence, it is important to preserve the conditions to which the radiator is adapted.

In most States the use of numbers of specified size is mandatory; and in many States number-plates are supplied to users by the State upon the issuance of a State automobile license. Usually the rigid securing of the number-plate to the machine is required by law; and, in the case of the front number-plate, practically the only space available is on the radiator. Heretofore, it has been common to employ imperforate sheet-metal plates of large size; and, where such plates are applied to radiators, they, in many instances, cover twenty or twenty-five per cent. of the radiator front. To suspend such plates from the axle is not only unsatisfactory to the user, but usually constitutes a failure to comply with the legal requirements.

It is my object to provide a means of applying numbers to automobile radiators in a cheap and durable manner which obviates the objections noted; and, to this end, I have conceived the idea of employing a foraminous plate having an enamel coating of one color and bearing the numbers and State abbreviation in enamel of another color, this perforate number-plate being securely fastened directly to the radiator, preferably by means of sheathed bolts which pass through the mesh-openings of the radiator.

My invention is illustrated in its preferred embodiment in the accompanying drawings, in which—

Figure 1 represents an elevational view of an automobile radiator having applied to its front surface a number-plate in accordance with my invention; Fig. 2, a broken section taken as indicated at line 2 of Fig. 1.

A represents an automobile radiator; and B, my improved number-plate applied thereto. The mesh-openings, or air-passages, of the radiator are designated 1; and the perforations of the number-plate are designated 2. The plate preferably is securely fastened to the radiator by bolts 3, which pass through the plate and through openings 1 of the radiator. The bolts are preferably sheathed in tubes 4 which extend through the passages 1 and are of suitable material to prevent injury to the radiator webs, which usually are of thin copper, or the like.

The plate B is shown with the number 266 painted or formed in enamel on its foraminous body; also, it is shown bearing the abbreviation Ill. (for Illinois). Preferably, the numerals and letters are in black enamel, and the body of the plate is in white enamel.

In the case of a given make of radiator, of large output, it is practicable to have the perforations 2 correspond in spacing with the spacing of the air-passages 1 of the radiator. For practical purposes, however, no attention need be paid to the registration of the openings; and, in this connection, it is noted that it is preferred to space the plate a short distance from the radiator, by means of washers 5, thus insuring the free circulation of air, regardless of whether the air-passages of the plate register with the air-passages of the radiator. A further advantage of this arrangement is the elimination of any possibility of the number-plate rattling against the radiator, in case of looseness of fastening, or in case of employment of sheet-metal too light to withstand all vibration.

It need hardly be stated that the plate may be of any desired contour and its perforations of any desired shape. Experiment has shown the durability and practicability of the improved plate, and demonstrated that such a plate may be employed in close association with the front surface of the radiator without appreciably lessening the radiating power.

What I regard as new, and desire to secure by Letters Patent, is—

The combination with an automobile radiator having a mesh-work with air passages therethrough, of a number plate secured to the front face of the radiator in spaced relation thereto, said number plate being provided with openings therethrough adapted to aline with the air passages in the radiator whereby cooling of the radiator will not be affected by the number plate.

PETER M. HOFFMAN.

In presence of—
R. A. RAYMOND,
O. C. AVISUS.